United States Patent
Liu et al.

(10) Patent No.: US 10,334,081 B2
(45) Date of Patent: Jun. 25, 2019

(54) SYSTEM AND METHOD FOR COMMUNICATING BETWEEN A COMMUNICATIONS MANAGEMENT SYSTEM USING ARINC 429 PROTOCOL AND AN INTERNET PROTOCOL RADIO

(71) Applicant: Honeywell International Inc., Morris Plains, NJ (US)

(72) Inventors: Yufeng Liu, Beijing (CN); Thomas D. Judd, Woodinville, WA (US); Likun Zou, Beijing (CN); Michael L. Olive, Cockeysville, MD (US)

(73) Assignee: Honeywell International, Inc., Morris Plains, NJ (US)

( * ) Notice: Subject to any disclaimer, the term of this patent is extended or adjusted under 35 U.S.C. 154(b) by 0 days.

(21) Appl. No.: 15/691,118

(22) Filed: Aug. 30, 2017

(65) Prior Publication Data
US 2019/0068757 A1    Feb. 28, 2019

(51) Int. Cl.
H04L 1/00 (2006.01)
H04L 29/06 (2006.01)
H04B 7/185 (2006.01)
H04L 29/08 (2006.01)

(52) U.S. Cl.
CPC ......... H04L 69/08 (2013.01); H04B 7/18506 (2013.01); H04L 67/12 (2013.01); H04L 69/18 (2013.01)

(58) Field of Classification Search
CPC ......... H04L 69/08; H04L 67/12; H04L 69/18; H04L 25/05; H04L 49/90; H04B 7/18506; H04B 7/00
See application file for complete search history.

(56) References Cited

U.S. PATENT DOCUMENTS

| | | | |
|---|---|---|---|
| 6,003,146 A * | 12/1999 | Beutler | H03M 13/091 714/701 |
| 7,487,015 B1 * | 2/2009 | Houlbert | G01C 21/16 244/158.1 |
| 7,689,327 B2 | 3/2010 | Loda | |
| 8,957,791 B2 | 2/2015 | Macrae et al. | |
| 2007/0127521 A1 * | 6/2007 | Sandell | H04L 25/05 370/466 |

(Continued)

OTHER PUBLICATIONS

Data Device Corporation, "Smart Protocol Converter!", "Retreived from http://www.ddc-web.com/News/Press/AceXtreme_Bridge.aspx on Jun. 22, 2017",, pp. 1-2.

(Continued)

*Primary Examiner* — Abdelnabi O Musa
(74) *Attorney, Agent, or Firm* — Fogg & Powers LLC (57) ABSTRACT

An apparatus is provided. The apparatus comprises a processing system comprising: an ARINC 429 converter system; an Internet protocol (IP) suite; and an Ethernet driver; wherein the processing system is configured to be coupled to a communications management system and at least one IP radio; wherein the processing system converts data, from the communications management system, from an ARINC 429 protocol into a transport layer protocol, an IP and a Ethernet protocol; and wherein the processing system converts data, from the IP radio, from the Ethernet protocol, IP, and transport layer protocol to the ARINC 429 protocol.

16 Claims, 7 Drawing Sheets

(56) References Cited

U.S. PATENT DOCUMENTS

| | | | |
|---|---|---|---|
| 2008/0037453 A1* | 2/2008 | Bolt | H04B 7/18506 370/310 |
| 2011/0255506 A1* | 10/2011 | Toth | H04B 7/18506 370/331 |
| 2012/0008697 A1 | 1/2012 | Emonide et al. | |
| 2015/0103735 A1 | 4/2015 | Bobrek | |
| 2015/0373154 A1* | 12/2015 | Voigt | H04L 67/2823 370/389 |

OTHER PUBLICATIONS

Data Device Corporation, "AceXtreme Bridge Device—Product Brief", , pp. 1-2.
Data Device Corporation, "AceXtreme Bridge Device6—Hardware Manual", , pp. 1-67.

* cited by examiner

SYSTEM AND METHOD FOR COMMUNICATING BETWEEN A COMMUNICATIONS MANAGEMENT SYSTEM USING ARINC 429 PROTOCOL AND AN INTERNET PROTOCOL RADIO

BACKGROUND

A communications management system (CMS) enables data and messaging transfers between an aircraft and ground based systems through one or more subnetworks. Communications management systems may also be known as communications management units.

Conventional subnetworks commonly used to exchange data, such as messages, include VHF, HF and satellite communications (SATCOM) communications aircraft communications addressing and reporting system (ACARS) networks. These subnetworks have limited bandwidth, and thus data throughput, capabilities. However there is a demand for increased bandwidth to facilitate increased throughput between aircraft and the ground stations. Broadband subnetworks that have increased bandwidth include AeroMACS, broadband SATCOM, and L-band terrestrial networks. These subnetworks utilize standard Internet Protocol (IP).

Aircraft radios that communicate through such IP enabled subnetworks are referred to as IP radios. IP radios utilize Ethernet link layer protocol (Ethernet protocol) communications to interface with other systems. Currently, CMSs on aircraft do not have the capability to interface with other systems, such as IP radios, using the Ethernet protocol. Therefore, there is a need to facilitate CMSs to communicate with IP radios.

SUMMARY

The embodiments of the present invention provide methods and systems for facilitating a communications management system to communicate with Internet protocol (IP) radios, and will be understood by reading and studying the following specification.

An apparatus is provided. The apparatus comprises a processing system comprising: an ARINC 429 converter system; an Internet protocol (IP) suite; and an Ethernet driver; wherein the processing system is configured to be coupled to a communications management system and at least one IP radio; wherein the processing system converts data, from the communications management system, from an ARINC 429 protocol into a transport layer protocol, an IP and a Ethernet protocol; and wherein the processing system converts data, from the IP radio, from the Ethernet protocol, IP, and transport layer protocol to the ARINC 429 protocol.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

For pedagogical purposes, a vehicle may be described hereinafter as an aircraft. However, it is understood that the teachings herein are applicable to other types of vehicles including without limitation other aircraft, space craft, water borne vehicles (e.g. ships), submersibles, automobiles, buses, trains, and any other type of vehicle.

A protocol translator system, which is inserted between a communications management system (CMS) and an IP radio, may be used to overcome the above referenced problem. The protocol translator system facilitates an external addition of an Ethernet protocol interface to a CMS.

Figure 1:
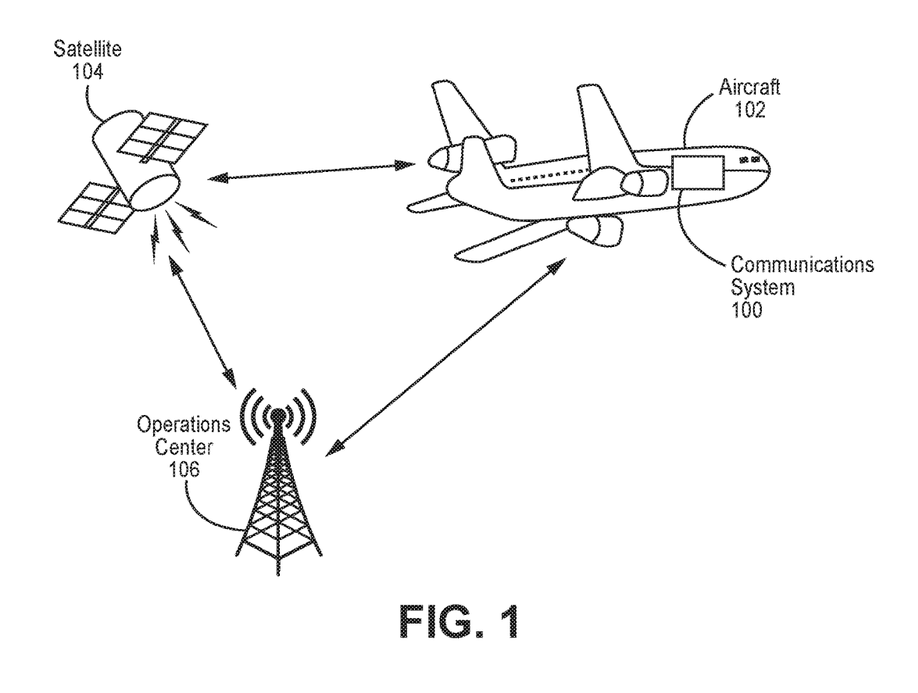
FIG. 1 illustrates one embodiment of an aircraft communicating with an operations center, where the aircraft includes a communications system including a protocol translator system.

FIG. 1 illustrates one embodiment of an aircraft 102 communicating with an operations center 106, where the aircraft 102 includes a communications system 100 including a protocol translator system. The operations center 106 may be an airline operations center, an operations center operated by a third-party service provider on behalf of one or more airlines, an air traffic control center, or another type of operations center.

In one embodiment, the aircraft 102 communicates directly with the operations center 106. In another embodiment, the aircraft 102 communicates through a satellite with the operations center 106. In a further embodiment, an intermediate communications system may couple the satellite 104 and/or the aircraft 102 to the operations center 106.

Data, e.g. data messages, communicated from the aircraft 102 (e.g. from the CMS) to the operations center 106 shall be deemed downlink data. Data communicated from the operations center 106 to the aircraft 102 (e.g. to the CMS) shall be deemed uplink data.

Figure 2:
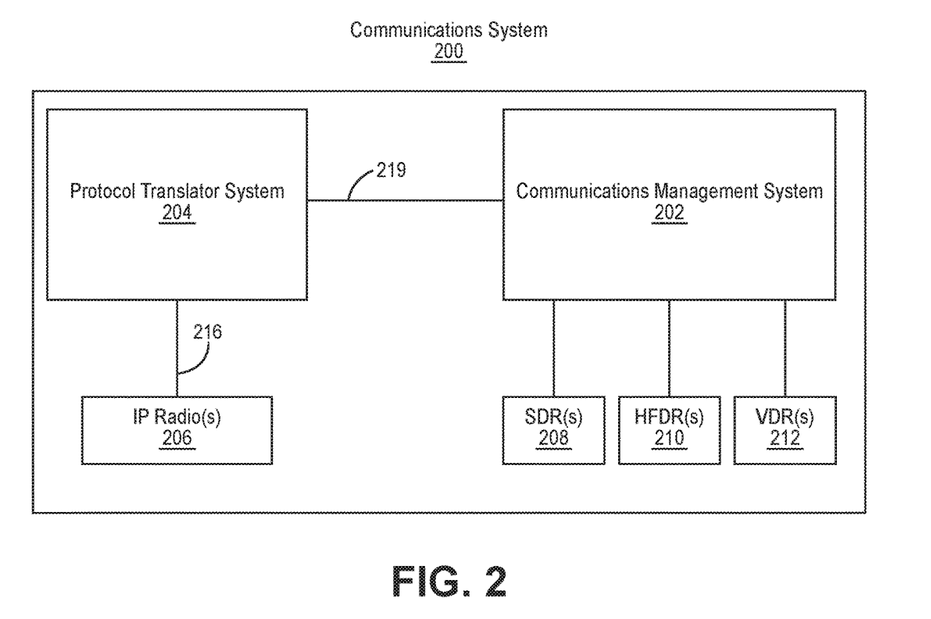
FIG. 2 illustrates one embodiment of a communications system including a protocol translator system.

FIG. 2 illustrates one embodiment of a communications system 200 including a protocol translator system (PTS) 204. The PTS 204 is configured to modify protocols of the downlink data and the uplink data, such as aircraft communications addressing and reporting system (ACARS) or aeronautical telecommunication (ATN) protocol messages. The PTS 204 is coupled to the CMS 202 through an ARINC 429 communications link 219. The PTS 204 is coupled to one or more IP radios (IP radio(s)) 206 through an Ethernet communications link 216. ARINC is derived from Aeronautical Radio, Incorporated. In another embodiment, the IP radio(s) 206 comprise one or more radios configured to facilitate communications with the AeroMACS, the broadband SATCOM, and/or the L-band terrestrial sub-networks. In a further embodiment, the CMS 202 is coupled to one or more of: at least one satellite data radio (SDR(s)) 208, at least one a high frequency data radio (HFDR(s)) 210, and at least one VHF data radio (VDR(s)) 212. SDR(s) 208 may also be known as SATCOM Data Unit(s) (SDU(s)).

In one embodiment, the PTS 204 may be part of another component, for example a display controller such as a touch screen controller, e.g. which may include a touch screen display which replaces a multi-function control display unit (MCDU). Although illustrated in FIG. 2 as being part of the communications system, the display controller (shown as the PTS 204) and the display may not be part of the communications system 200. To the extent not included already in the display controller, the display controller, for example, would have to have added to it the components illustrated in FIG. 3.

In one embodiment, the PTS 204 includes an Ethernet port, e.g. a Quadrax connector, into which an Ethernet cable, that comprises the Ethernet link 216, is inserted. It is beneficial to incorporate the PTS 204 into an existing component such as the display controller because such display controller may already include such an Ethernet port, and possibly also a processing system which can be used by components of the processing system, e.g. that are subsequently described.

Figure 3:
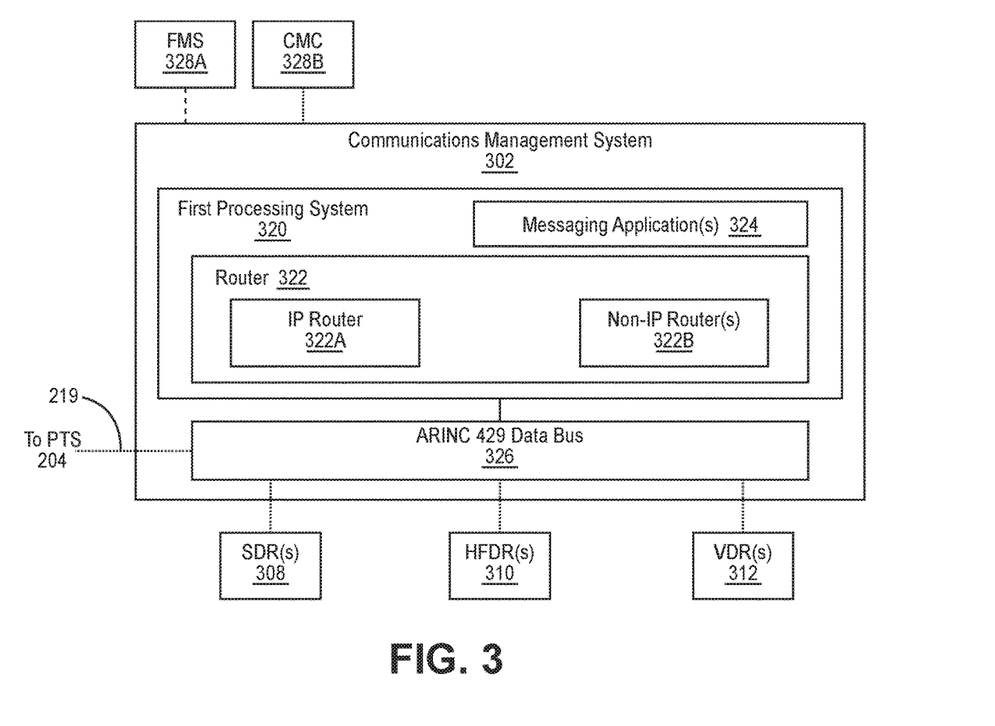
FIG. 3 illustrates one embodiment of a communications management system configured to be coupled to a protocol translator system.

FIG. 3 illustrates one embodiment of a communications management system 302 configured to be coupled to the protocol translator system 204. The CMS 302 comprises a first processing system 320 that includes a router 322 configured to route data, such as messages, between radios (IP radio(s) 206, and possibly SDR(s) 208, HFDR(s) 210, VDR(s) 212, and/or other non-IP radio(s)), and the CMS 302 and/or external systems. The radios are coupled to the CMS 302 through an ARINC 429 data bus 326. The ARINC 429 communications link 219 is coupled to the ARINC 429 data bus 326. In another embodiment, the router 322 includes an IP router 322A and at least one non-IP router (non-IP router(s)) 322B which respectively route messages to the IP radio(s) 206 and non-IP radios (e.g. SDR(s) 208, HFDR(s) 210, and/or VDR(s) 212). The data, e.g. messages, are generated by applications in external systems coupled to the CMS 302 and/or by one or more messaging applications (messaging application(s)) 324 in the CMS 302. In a further embodiment, such external systems include a flight management system (FMS) 328A and/or a central maintenance computer (CMC) 328B. In yet another embodiment, the external systems include cabin terminal(s), an electronic flight bag, and/or aircraft condition monitoring systems.

In one embodiment, the first processing system 320 is a state machine, e.g. a combination of one or more processor(s), memor(ies), field programmable gate arrays, and/or application specific integrated circuits (ASICs). The processor(s) may be central processing unit(s) and/or digital signal processing unit(s). The memor(ies) may be random access memor(ies), read only memor(ies), flash memor(ies), and/or magnetic memorie(s). In one embodiment, the router 322 and the messaging application(s) 324 are software stored, e.g. in the memor(ies), and executed by the processing system.

Figure 4:
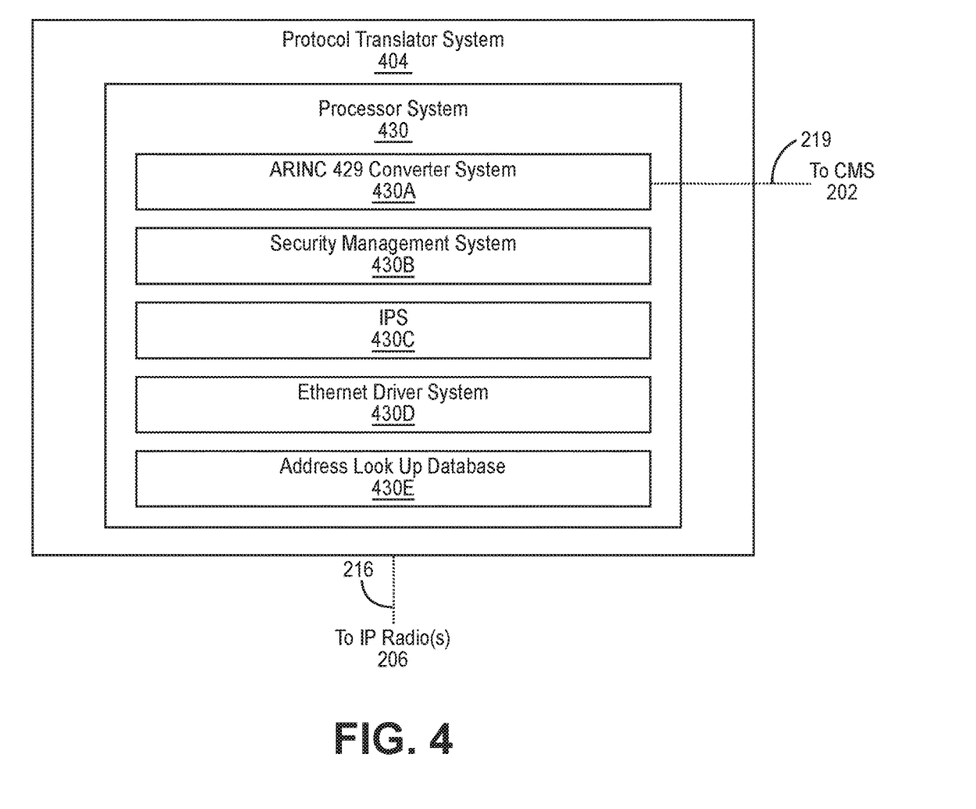
FIG. 4 illustrates one embodiment of a protocol translator system.

FIG. 4 illustrates one embodiment of the PTS 404. The PTS 404 converts:

(a) downlink data, such as ACARS and/or ATN messages, from the CMS 202 from the ARINC 429 protocol into a transport layer protocol, the IP, and an Ethernet protocol; and (b) uplink data, such as ACARS and/or ATN messages, from the IP radio(s) 206 from the Ethernet protocol, the IP, and the transport layer protocol into the ARINC 429 protocol.

In one embodiment, as will be subsequently illustrated, a bit-oriented file transfer protocol of ARINC 429 is used where data is split into Link Data Units (LDUs) each of which contains multiple ARINC 429 words (multiple words).

In the illustrated embodiment, the PTS 404 includes a processing system 430. In another embodiment, the processor system 430 includes an ARINC 429 converter system 430A, an Internet protocol suit (IPS) 430C, and an Ethernet driver system 430D. In a further embodiment, the PTS 404 includes a security management system 430B. In yet another embodiment the PTS 404 includes an address lookup database 430E.

For the downlink data in the ARINC 429 protocol that is to be converted to the transport layer protocol, the IP, and the Ethernet protocol, the ARINC 429 converter system 430A extracts payload data from words (between the header words and the end of transmission word) of each LDU comprising the downlink data, e.g. a message. In one embodiment, the ARINC 429 converter system 430A and/or the IPS 430C combines the payload data from one or more LDUs to form a total data payload, e.g. corresponding to a message. In another embodiment, security data is appended to the total data payload. In a further embodiment, the total data payload (and security data—if used) is segmented, e.g. by the IPS 430C, into data payloads; subsequently transport layer segments, IP datagrams (each encapsulating a transport layer segment), and finally Ethernet frames (each encapsulating a IP datagram) are created, e.g. by the IPS 430C and/or Ethernet driver system 430D, with the data payloads.

In one embodiment, for the uplink data in the Ethernet protocol, the IP, and the transport layer protocol that is being converted to the ARINC 429 protocol, the IPS 430C extracts data payloads from each transport layer segment. In one embodiment, the ARINC 429 converter system 430A and/or the IPS 430C combines the data payloads from one or more transport layer segments to form a total data payload, e.g. corresponding to a message, and the security data (if used). In another embodiment, the total data payload (and security data—if used) is segmented, e.g. by the ARINC 429 protocol converter system 430A, into payload data; subsequently LDU(s) are created, e.g. by the ARINC 429 protocol converter system 430A.

In one embodiment, the IPS 430C extracts only IP packets and/or transport layer segments from Ethernet frames. In this embodiment, the extracted IP packets or transport layer segments may be combined into sets, and converted individually or as sets into ARINC 429 protocol by the ARINC 429 converter system 430A, and communicatively coupled to the CMS 302. One or more portions of an IPS are located in the CMS 302, e.g. in the first processing system 320, and facilitate (a) extraction of transport layer segments from IP packets and/or extraction of data payloads from transport layer segments, and (b) combination of data payloads to create a total data payload.

For the purposes of clarity, the data, e.g. corresponding to subject matter of a message but excluding source, destination, error correction, and other administrative information shall be referred to as a data payload for transport layer segments, IP packets and Ethernet frames, and payload data for LDUs. Such data payload shall be the data of each transport layer segment. Such payload data shall be the data of each LDU. The combination of either of the data payload or payload data shall be referred to as the total data payload.

In one embodiment, for the downlink data in the ARINC 429 protocol that is being converted to the transport layer protocol, the IP, and the Ethernet protocol, the IPS 430C creates transport layer segments using one of two transport layer protocols: user datagram protocol (UDP) or transmission control protocol (TCP). Each transport layer segment has a header (corresponding to the transport layer protocol utilized) appended to the data payload. The amount of data included in each segment is selected by the designer of the system or defined by a standard.

In one embodiment, data is formed into transport layer segments and/or IPs by a portion of the IPS located in the CMS 302, e.g. by the first processing system 320. Such data is communicatively coupled from the CMS 302 to the protocol translator system 404. The portion of the IPS in the protocol translator system 404 extracts transport layer segments and/or IPs from downlink data in the ARINC 429 protocol. In this embodiment, the extracted transport layer segments or IPs are converted respectively to IPs and Ethernet frames, or Ethernet frames by the portion of the IPS 430C in the protocol translator system 404, and communicatively coupled to the IP radio(s) 206. In the CMS 302, the data payloads of each transport layer segment are extracted and combined in the portion of the IPS in the protocol translator system 404. For example, the portion of the IPS in the protocol translator system 404 is located in the first processing system.

The IPS 430C then adds an IP header to each transport layer segment to form an IP packet. Finally, the IPS 430C and/or the Ethernet driver system 430D adds an Ethernet header and trailer to each IP packet to form an Ethernet frame.

In one embodiment, the security data includes a digital signature and/or cyclic redundancy check (CRC) value. If security data is extracted, then, the security data is analyzed as described below.

The Ethernet driver system 430D communicates with the IPS 430C through an application program interface and facilitates obtaining information from hardware, e.g. of the IP radio(s) 206 and the PTS 404, about source and destination media access controller address(es). The Ethernet driver system 430D also facilitates transmitting and receiving the Ethernet frames through the hardware. In one embodiment, such hardware includes media access controller(s).

The security management system 430B verifies, and/or adds, a layer of security respectively in and/or to the data payload. The security management system 430B is intended to prevent malicious communications from being surreptitiously received and processed by the communications system 200. This technique is illustrated in U.S. patent application Ser. No. 15/498,415 filed on Apr. 26, 2017 and entitled "Systems and Methods for Secure Communications Over Broadband Datalinks," which is hereby incorporated by reference in its entirety. To the extent a digital signature and/or a CRC value are appended to the data, the security management system 430B analyzes and verifies the digital signature and/or the CRC value to ensure that the received data had not been maliciously manipulated or sent by an unauthorized source, e.g. pretending to be a legitimate operations center. In one embodiment, the CRC value is calculated and verified based upon the remainder of a polynomial division of the data. In another embodiment, the digital signature is created using public key infrastructure technology, and, e.g. a private key associated with the source of the data payload, for example an operations center 106. In a further embodiment, the security management system 430B can also append the digital signature and/or the CRC value to downlink total data payload, e.g. before segmentation to create transport layer segments. In yet another embodiment, the security management system 430B is located in the CMS 302, e.g. the first processing system 322; therefore, the digital signature and/or CRC value would be appended to and/or extracted from data in CMS 302.

In one embodiment, the address lookup database 430E stores one or more IP addresses and port numbers of the destinations, e.g. operation center(s), with which the IP radio(s) 206 communicate. In another embodiment, the address lookup database 430E includes an airline identifier and a corresponding destination IP address and port number, e.g. to be used to create the IP header. In a further embodiment, the address lookup database 430E includes a source IP address and port, e.g. for the IPS 430C to create the IP header. For data being sent from an airplane to a ground station that is an airline operations center (AOC), ARINC 429 protocol data will include an airline indicator stored in an LDU of the data being sent. In yet another embodiment, based upon such airline indicator, for example extracted from by the ARINC 429 converter system 430A, the IPS 430C will obtains the destination IP address and port for the corresponding AOC from the address lookup database 430E, and inserts such destination IP address and port, and the source IP address and port into the IP header.

Figure 5:
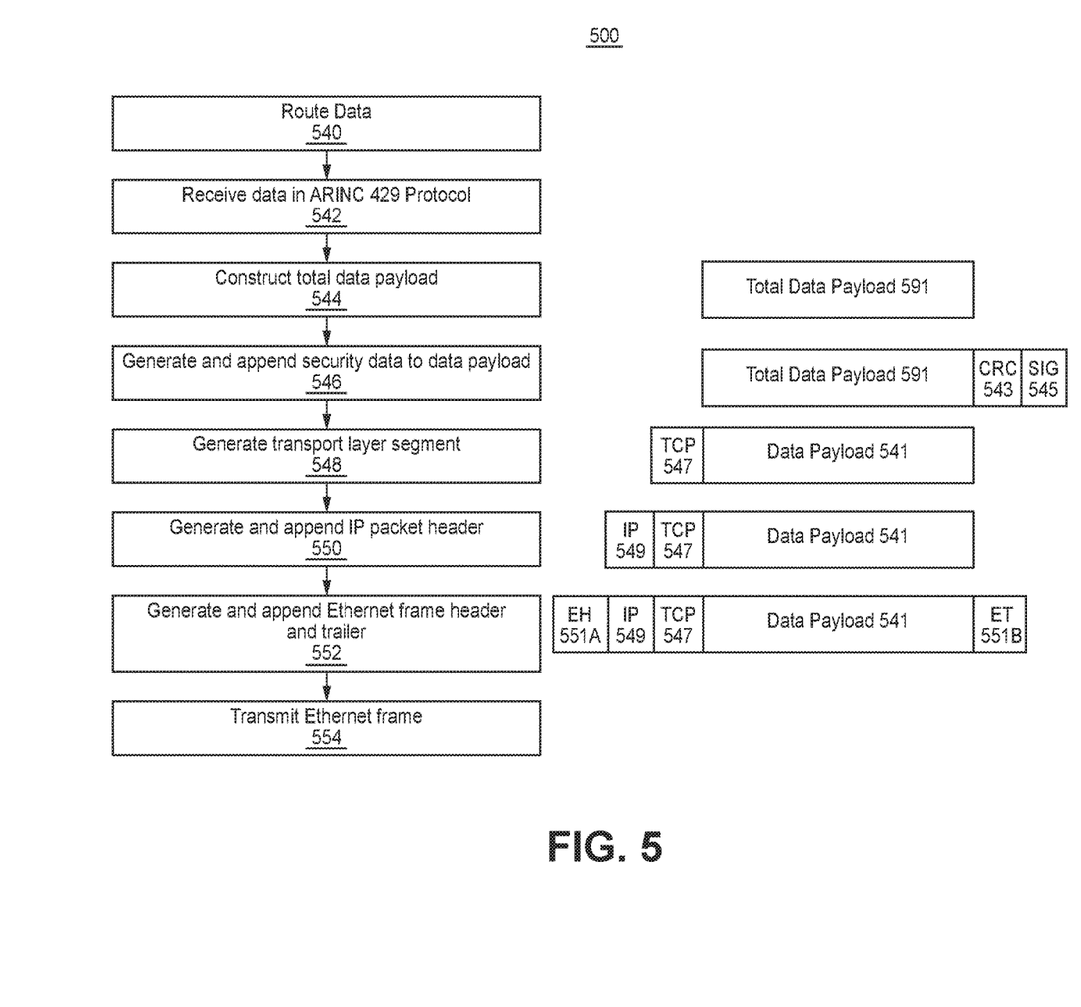
FIG. 5 illustrates one embodiment of a method of converting data from an ARINC 429 protocol received from a communications management system to an Ethernet protocol.

FIG. 5 illustrates one embodiment of a method of converting data from ARINC 429 protocol received from a communications management system to the Ethernet protocol 500. To the extent that the embodiment of the method shown in FIG. 5 is described herein as being implemented in the systems shown in FIGS. 1 through 4, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In one embodiment, in block 540, route data, e.g. with the CMS 302 (for example with the IP router 322A) to an IP radio through the PTS 204. In block 542, receive data in ARINC 429 protocol from a CMS 202, e.g. at the PTS 204. The data may have originated in application(s) in the CMS or in other systems such as a flight management system or a central maintenance computer.

In one embodiment, in block 544, construct a total data payload 591, e.g. in the PTS 404 such as with the ARINC 429 protocol converter 430A or the IPS 430C. Such total data payload 591 is formed by payload data from one or more LDUs of the received data in the ARINC 429 protocol.

In one embodiment, in block 546 generate and append security data to the total data payload 591, e.g. with the security management system 430B. In another embodiment, the security data comprises a CRC value and/or a digital signature.

In block 548, generate transport layer segments with each having a transport layer segment header (TCP) 547, e.g. using the IPS 430C (such as the transport layer functionality of the IPS 430C). Each transport layer segment includes all or a portion of the total data payload 541. In one embodiment, if security data has been generated it will be included in the last transport layer segment. Each transport layer segment header includes source and destination ports and a checksum value. The source and destination ports are endpoints to logical connections. The checksum, e.g. the sum of the payload data bytes, is used at the endpoint to verify that the data payload of the transport layer segment was received without error. The TCP transport layer segment header also includes a sequence number to facilitate a recipient of the transport layer segments to reassemble the payload data 541 (and security data if appended) in the correct order. TCP is used to symbolize the transport layer segment header 547 for illustrative purposes; however, the transport layer can utilize TCP or UDP, and thus the transport layer segment header 547 can be a TCP or UDP header.

In block 550, generate and append an IP header 549, e.g. using the IPS 430C (such as the IP functionality of the IPS 430), to each transport layer segment. This forms an IP packet. The IP header includes the source IP address and the destination IP address. It may also include time-to-live data that limits the lifespan of that portion of payload data and/or security data contained in the IP packet.

In block 552, generate and append an Ethernet header 551A and an Ethernet trailer 551B to the IP packet. This forms an Ethernet frame. In one embodiment, the IPS 430C (such as the Ethernet functionality of the IPS 430C) and/or the Ethernet driver system 430D are used to perform the generation and appending function. The Ethernet header 551A includes the source and destination media access controller addresses. The Ethernet trailer 551B includes a frame check sequence, which is a CRC value that is used by the recipient of the Ethernet frame to detect any data corruption within the frame arising during communications. In block 554, transmit the Ethernet frame, e.g. to an IP radio over the Ethernet communications link 216.

Figure 6:
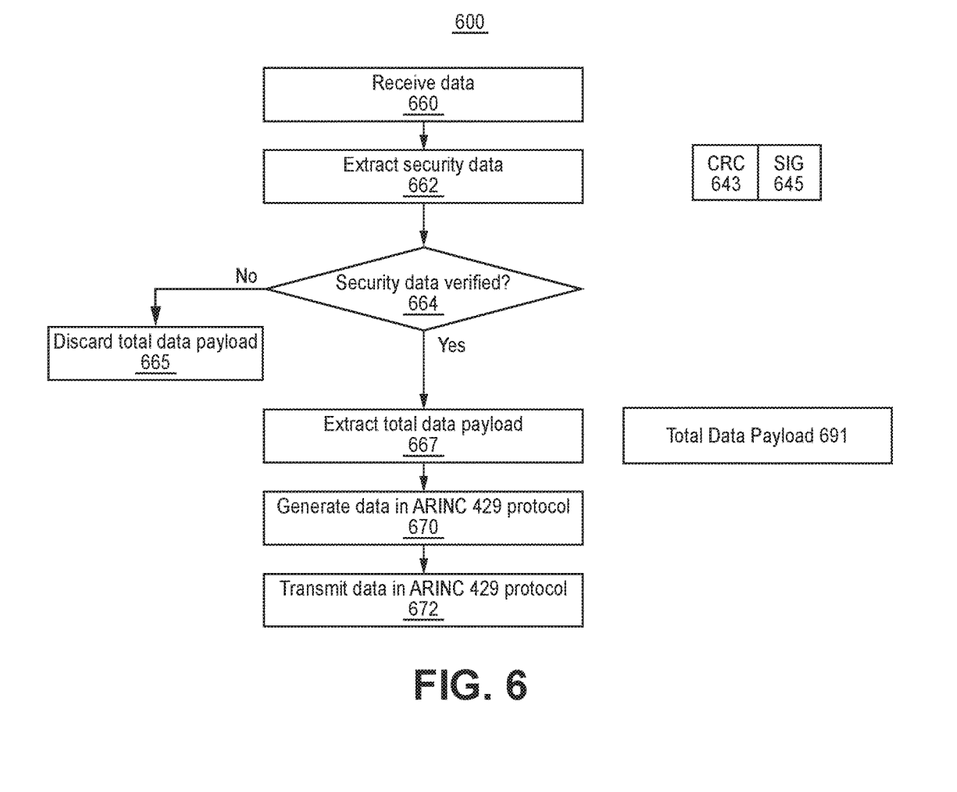
FIG. 6 illustrates one embodiment of a method of converting data in the Ethernet protocol to the ARINC 429 protocol, and transmitting the data to a communications management system.

FIG. 6 illustrates one embodiment of a method of converting data in the Ethernet protocol to ARINC 429 protocol, and transmitting the data to a communications management system 600. To the extent that the embodiment of the method shown in FIG. 6 is described herein as being implemented in the systems shown in FIGS. 1-4, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner).

In block 660, receive data, e.g. from an IP radio 206 at the PTS 204, in Ethernet frames. In one embodiment, proceed to block 667. Alternatively, in another embodiment, proceed to block 662.

In block 662, extract security data, i.e. the CRC value 643 and/or the digital signature 645. In one embodiment, extract the security data from the last transport layer segment. If the security data is extracted, then, in block 664, verify the security data, e.g. to ensure the authenticity of the data's source and/or that the data has not been maliciously altered. If the security data can not be verified, then, in block 665, discard the corresponding total data payload 691.

In one embodiment, security data is verified by extracting and reassembling the data payloads 541 of each transport layer segment to form the total data payload 691, calculating a CRC value from the total data payload 691, and comparing the calculated CRC value to the CRC value in the security data; if they are the same the total data payload 691 is verified as not having been altered. In another embodiment, the digital signature is validated with public key infrastructure technology using a public key associated with the source; if the digital signature validation is successful, then the authenticity of source of the total data payload 691 is verified. In a further embodiment, different sources of total data payload 691 (e.g. different operation centers 106) may have different private keys; in yet another embodiment, the corresponding public keys associated with the different sources may be indexed by source (e.g. operations center) and thus stored in the address lookup database 430E.

If the security data is verified, then proceed to block 667. In one embodiment, in block 667, extract the total data payload 691 if this was not already performed, e.g. in block 662. In one embodiment, extract the total data payload 691 by extracting and then reassembling the data payloads 541 of each transport layer segment to form the total data payload 691.

In block 670, generate data in the ARINC 429 protocol, e.g. with the ARINC 429 converter system 430A. In one embodiment, generating the data in the ARINC 429 protocol comprises forming payload data, e.g. by segmenting the total data payload 691. Then, LDU(s) are generated using the payload data, e.g. with the ARINC 429 converter system 430A.

Figure 7:
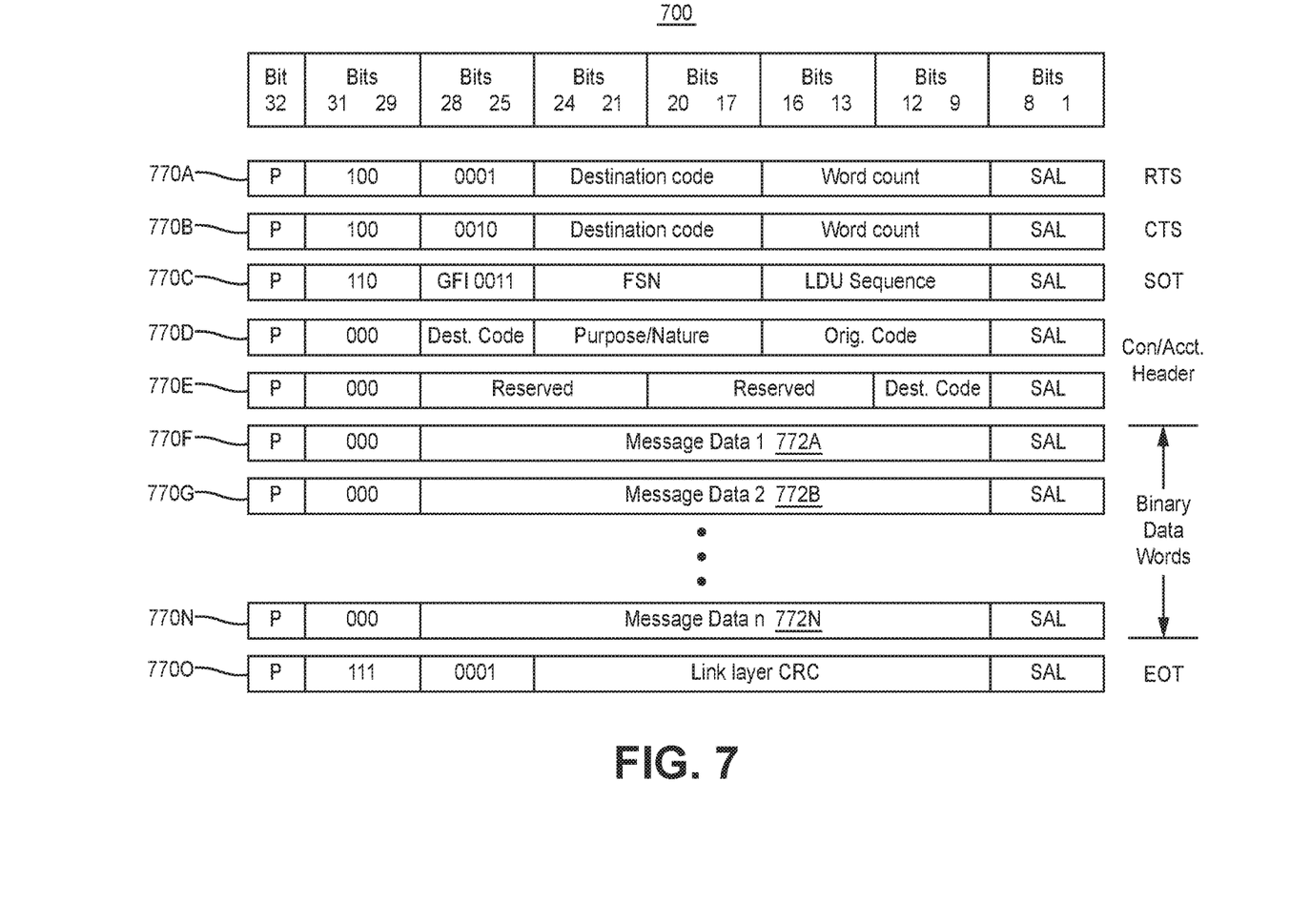
FIG. 7 illustrates one embodiment of a data structure for a link data unit comprised of data words.

FIG. 7 illustrates one embodiment of a data structure for a link data unit 700 comprised of data words 700A-700N. Data words 700F, 700G, 700N respectively comprise portions of payload data 702A, 702B, 702N of the LDU 700. In one embodiment, data (such as a message) may comprise more than one LDU 700. Returning to FIG. 6, in block 672 transmit data in the ARINC 429 protocol to the communications management system 202.

Example Embodiments

Example 1 includes an apparatus, comprising: a processing system comprising: an ARINC 429 converter system; an Internet protocol (IP) suite; and an Ethernet driver; wherein the processing system is configured to be coupled to a communications management system and at least one IP radio; wherein the processing system converts data, from the communications management system, from an ARINC 429 protocol into a transport layer protocol, an IP and a Ethernet protocol; and wherein the processing system converts data, from the at least one IP radio, from the Ethernet protocol, IP, and transport layer protocol to the ARINC 429 protocol.

Example 2 includes the apparatus of Example 1, wherein the processing system further comprises a security management system; and wherein the security management system analyzes security data appended to a total data payload received by the at least one IP radio.

Example 3 includes the apparatus of Example 2, wherein the security data comprises at least one of a digital signature and a cyclic redundancy check value.

Example 4 includes the apparatus of any of Examples 2-3, wherein the security management system appends security data to a total data payload data received from the communications management system.

Example 5 includes the apparatus of any of Examples 1-4, wherein the processing system further comprises an address lookup database comprising at least one destination IP address.

Example 6 includes the apparatus of any of Examples 1-5, wherein the processing system is part of a display controller.

Example 7 includes the apparatus of any of Examples 1-6, further comprising the communications management system coupled to the protocol translator system; wherein the communications management system is configured to be coupled to at least one non-IP radio; wherein the communications management system comprises a first processing system comprising a router; and wherein the router routes data to and from the at least one IP radio.

Example 8 includes the apparatus of Example 7, wherein the communications management unit comprises a portion of the IP suite.

Example 9 includes a method, comprising: receiving data in an ARINC 429 protocol from a communications management system; converting data in the ARINC 429 protocol to an Ethernet protocol; and transmitting the converted data to a radio.

Example 10 includes the method of Example 9, wherein converting data in the ARINC 429 protocol to transport layer protocol, IP and the Ethernet protocol, comprises: extracting payload data from each link data unit; and combining the payload data from each link data unit.

Example 11 includes the method of any of Examples 9-10, wherein converting data in the ARINC 429 protocol to the transport layer protocol, IP, and Ethernet protocol comprises: creating transport layer segments, wherein each segment has a transport layer segment header; adding an IP header to each transport layer segment to form IP packets; and adding an Ethernet header and an Ethernet trailer to each IP packet to form Ethernet frames.

Example 12 includes the method of any of Examples 9-11, further comprising: appending, to payload data of the data, security data.

Example 13 includes the method of Example 12, wherein appending security data comprises appending at least one of a cyclic redundancy check value and a digital signature.

Example 14 includes a method, comprising: receiving data in an Ethernet protocol, Internet protocol (IP), and transport layer protocol from an IP radio; converting the data in the Ethernet protocol, IP, and transport layer protocol to the ARINC 429 protocol; and transmitting the converted data to a communications management system.

Example 15 includes the method of Example 14, wherein converting the data comprises: extracting a data payload from each transport layer segment; and combining the data payload.

Example 16 includes the method of any of Examples 14-15, wherein converting data in the Ethernet protocol, IP, and transport layer protocol to the ARINC 429 protocol comprises creating at least one link data unit (LDU), wherein each LDU is comprised of words.

Example 17 includes the method of any of Examples 14-16, further comprising: extracting, from security data; and verifying the security data.

Example 18 includes the method of Example 17, further comprising discarding the total data payload if the security data can not be verified.

Example 19 includes the method of any of Examples 17-18, wherein extracting security data comprises extracting at least one of a cyclic redundancy check (CRC) value and a digital signature from a total data payload.

Example 20 include the method of Example 14, wherein converting data in the Ethernet protocol to the ARINC 429 protocol comprises converting data in the Ethernet protocol to an Internet protocol (IP) and a transport layer protocol.

What is claimed is:
1. An apparatus, comprising:
a processing system comprising processing circuitry coupled to memory circuitry;
wherein the processing system is configured to be communicatively coupled to a communications management system and at least one Internet protocol (IP) radio;
wherein the processing system is configured to convert data, from the communications management system, from an Aeronautical Radio Incorporated (ARINC) 429 protocol into at least one of a transport layer protocol, an IP, and an Ethernet protocol by:
extracting payload data from each link data unit (LDU) of the data in the ARINC 429 protocol;
forming a total data payload by combining the payload data from each LDU;
creating at least one of:
at least one transport layer segment each of which comprises at least a portion of the total data payload, where each transport layer segment has a transport layer segment header;
at least one IP packet by generating an IP packet header for each of the at least one transport layer segment, and adding the IP packet header to the corresponding transport layer segment; and
at least one Ethernet frame by generating an Ethernet header and an Ethernet trailer for each of the at least one IP packet, and adding the Ethernet header and the Ethernet trailer to respectively the beginning and end of the corresponding IP packet; and
wherein the processing system is configured to convert data, from the at least one IP radio, from the Ethernet protocol to the ARINC 429 protocol by:
extracting at least one of data payloads of each transport layer segment and datagrams of each IP packet;
creating a total data payload by combining one of the extracted data payloads and the extracted datagrams;
segmenting the total data payload into segmented payload data; and
generating a link data unit (LDU) for each segmented payload data.

2. The apparatus of claim 1, wherein the processing system further is further configured analyze security data appended to a total data payload received by the at least one IP radio.

3. The apparatus of claim 2, wherein the security data comprises at least one of a digital signature and a cyclic redundancy check value.

4. The apparatus of claim 2, wherein the processing system is further configured to append security data to a total data payload data received from the communications management system.

5. The apparatus of claim 1, wherein the processing system further comprises an address lookup database comprising at least one destination IP address.

6. The apparatus of claim 1, wherein the processing system is part of a display controller.

7. The apparatus of claim 1, further comprising the communications management system coupled to the processing system;
    wherein the communications management system is configured to be coupled to at least one non-IP radio;
    wherein the communications management system comprises a first processing system comprising a router; and
    wherein the router routes data to and from the at least one IP radio.

8. The apparatus of claim 7, wherein the communications management unit comprises a portion of an IP suite.

9. A method, comprising:
    receiving data in an Aeronautical Radio Incorporated (ARINC) 429 protocol from a communications management system;
    converting data in the ARINC 429 protocol to an Ethernet protocol by:
        extracting payload data from each link data unit (LDU) of the data in the ARINC 429 protocol;
        forming a total data payload by combining the payload data from each LDU;
        creating at least one of:
            at least one transport layer segment each of which comprises at least a portion of the total data payload, where each transport layer segment has a transport layer segment header;
            at least one IP packet by generating an IP packet header for each of the at least one transport layer segment, and adding the IP packet header to the corresponding transport layer segment; and
            at least one Ethernet frame by generating an Ethernet header and an Ethernet trailer for each of the at least one IP packet, and adding the Ethernet header and the Ethernet trailer to respectively the beginning and end of the corresponding IP packet;
    transmitting the converted data to an IP radio;
    receiving data in an Ethernet protocol, Internet protocol (IP), and transport layer protocol from an IP radio;
    converting the data in the Ethernet protocol to the Aeronautical Radio Incorporated (ARINC 429) protocol by:
        extracting at least one of data payloads of each transport layer segment and datagrams of each IP packet;
        creating a total data payload by combining one of the extracted data payloads and the extracted datagrams;
        segmenting the total data payload into segmented payload data; and
        generating a link data unit (LDU) for each segmented payload data; and
    transmitting the converted data to a communications management system.

10. The method of claim 9, further comprising appending security data to the total data payload.

11. The method of claim 9, wherein converting data in the ARINC 429 protocol to the Ethernet protocol comprises converting data in the ARINC 429 protocol to a transport layer protocol and an Internet protocol (IP).

12. The method of claim 9, wherein each LDU is comprised of words.

13. The method of claim 9, further comprising:
    extracting security data; and
    verifying the security data.

14. The method of claim 13, further comprising discarding the total data payload if the security data cannot be verified.

15. The method of claim 13, wherein extracting security data comprises extracting at least one of a cyclic redundancy check (CRC) value and a digital signature from a total data payload.

16. The method of claim 9, wherein converting data in the Ethernet protocol to the ARINC 429 protocol comprises converting data in the Ethernet protocol to an Internet protocol (IP) and a transport layer protocol.

\* \* \* \* \*